Dec. 3, 1957 A. NEUMANN 2,815,216

SOUND RECORDING APPARATUS

Filed Jan. 27, 1955

INVENTOR.
ADOLF NEUMANN
BY Ralph B. Stewart
ATTORNEY

United States Patent Office 2,815,216

Patented Dec. 3, 1957

2,815,216

SOUND RECORDING APPARATUS

Adolf Neumann, Furth, Germany, assignor to Max Grundig, Furth, Germany

Application January 27, 1955, Serial No. 484,470

Claims priority, application Germany February 25, 1954

3 Claims. (Cl. 274—1)

Figure 1:
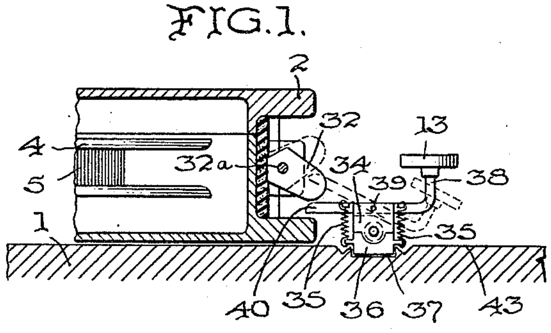

In sound recording by means of magnetic sound tape apparatus it is old to undertake the marking of certain places on the tape by the application of magnetically effective material, for example, in the form of a solution of finely divided magnetizable substances (iron oxide powder in a rapidly drying binding agent) or of wax pencils having a finely divided magnetizable substance embodied therein.

Further, in apparatus for magnetic recording and/or reproduction of sound, an arrangement is known for giving an indication of the beginning and end of a plurality of separate sound recordings. In this known arrangement, at the beginning and end of the several sound recordings holes are punched manually at different places on a card which moves synchronously with the sound carrier or tape. These holes indicate by their number and/or position on the card the beginning and end of the sound records concerned. In this known arrangement, however, the perforated card is not usable again and, moreover, the card must be replaced each time upon receiving new sound recordings, e. g., business letters, a situation which involves inconveniences.

Above all, however, where the requirement is for a rapid, easy and readily visible indication without the necessity of always having to use new sound record carriers, the known indicating processes and indicating arrangements are usable with only imperfect results since the delicate sound record carriers become damaged during the time-consuming removal of the markings under present conditions or else the cards used to provide the indication of the several independent sound recordings must be renewed or exchanged. In contrast with this, the invention concerns a magnetic sound dictating apparatus with arrangement for the indication of the beginning and/or end of several received sound records which are independent of one another, in particular, a magnetic sound dictating apparatus with a spool container which avoids the abovementioned defect of known magnetic sound apparatus. The arrangement proposed in accordance with the invention is embodied in a means shiftable synchronously in accordance with the movement of the record carrier, and mechanically reversible marking means arranged in accordance with a plurality or a multiple number of distinct indicating positions of these means which are adjustable from rest position into marking position by release of the synchronously shiftable means and can be returned from this marking position to rest position as required. This arrangement is useful especially in magnetic sound dictating apparatus with interchangeable spool containers, and can be used over and over again without replacement or change and can be employed with the greatest simplicity.

The invention is usable for sound record carriers of any desired form, especially for those sound record carriers of tape, wire, plate or cylinder type now used in dictating apparatus. In this case we are concerned with sound record carriers of finite length or carriers of the endless type. The invention relates particularly to a magnetic sound dictating apparatus having containers for the spools. The embodiment according to the invention facilitates the indication of the track lengths of a plurality of independent sound records, especially the indication of the length of letters, which indications heretofore have been produced by the dictator by means of a slip of paper or cardboard with notes, such as "short" or "long," for the individual letters. In the case of typewritten matter which offers the problem of transcribing the individual dictated pieces of matter over into typewriting, the invention offers the advantage that the typist can get an exact picture of the individual pieces of dictated matter and can accordingly distribute the respective pieces of dictated matter onto the individual typewritten sheets.

Figure 2:
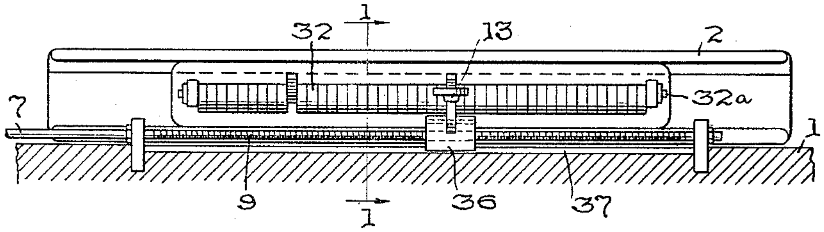

One embodiment of the invention is illustrated in the accompanying drawing in which Figure 1 is a sectional view, on an enlarged scale, of Figure 2 taken along the line 1—1; Figure 2 is a front elevational view of a removable spool container showing the invention applied thereto; and Figure 3 is a plan view of Figure 2 with a portion thereof broken away to show the indicator members.

In this embodiment a set of marking or indicator devices which are preferably replaceable and are mounted on the front wall of the sound tape container 2, serve to mark or indicate the ends of the letters and/or, if desired, the beginnings of the letters recorded on the tape.

As shown particularly in Figure 1, the indicator devices consist of tipping levers 32 with a central dead point beyond which they may be pressed. For this purpose the tipping levers 32 are pivoted upon a rod **32*a* and their rear ends are in contact with a sponge rubber cushion 33 supported on the front wall of spool container 2. In the rest position, the tipping levers 32, the forward ends of the levers, all point downwardly, and in their indicating positions, as shown in dotted lines in Figure 1, they point upwardly. The lower half of the tipping lever, which may, for example, be black, is suitably given a different color than the upper half, which may, for example, be white, so that after the tipping of the lever not only the change in position, but also the difference in color becomes apparent thereby giving an indication of the ends and/or the beginnings of the letters dictated onto the magnetic tape 5**.

Figure 3:
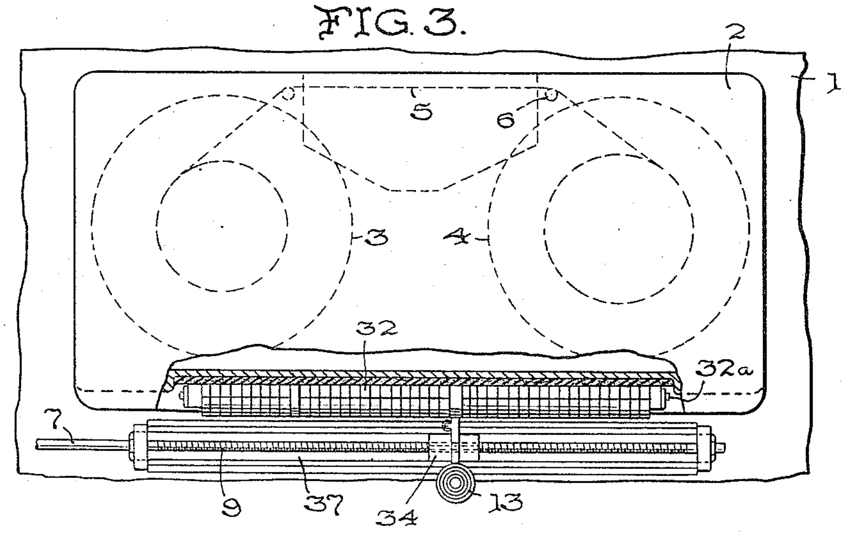

Figures 1 to 3 show in part the upper portion 1 of a magnetic tape apparatus having a transparent, demountable spool container 2 made of synthetic material such as plastic, in the form of a shell having two parts. The container 2 has, generally speaking, a shallow, thin squared form. The two spools 3 and 4 formed preferably of synthetic material, such as plastic, are mounted in the left and right hand portions of the container, and the sound tape 5 is so guided by two guide pins 6 attached to a part of the container, that when the container has been mounted in operative position upon the magnetic tape apparatus 1 (only part of which is illustrated) the tape is positioned in operative relation with the magnetic recording head (or reproducing head) which is not illustrated.

Driving of the sound tape 5 at constant speed can be effected in known manner by suitable means including a driving motor. This driving motor can also be used in known manner to drive the two spools 3, 4 by driving couplings which are not shown. Furthermore, by way of a cable or shaft 7 the driving energy of the motor can be transmitted also to the indicating arrangement, either directly from the motor or through the driving coupling to one of the spools. The rotary-drive-movement of shaft 7 is transformed through helically-threaded shaft 9 into a corresponding linear movement of the control means 11 along the length of shaft 9.

The adjustable or movable control means 11 moving synchronously with the tape record carrier 5 to show the position of the sound track at any moment, is mounted on a half-shell (half-nut) 34 provided with a screw thread which engages the screw thread of the driving shaft 9. Half-nut 34 is connected by way of two springs 35 with an abutment 36 which has no screw-thread and is able to slide in an axial direction on the helical shaft 9. While the lower threadless abutment 36 is guided by a slot 37 in the wall 43 of the magnetic tape apparatus, the half-nut 34 can be lifted upwardly against the force of the two spiral springs 35, so that the control means 11 may be shifted along shaft 9 at will, for example, when the record container is to be removed and a new container substituted. The operating knob 13 of control means 11 is mounted on the right-hand, upwardly bent end 38 of a two-armed lever 40 which is pivoted to half-nut 34 on the axis 39; the left lever arm of 40 serving also as a control means or lever for reversing the position of the individual tipping levers 32 upon depressing knob 13. This reversal of position of the tipping lever 32 is produced at any desired tape positions, preferably at the end of the individual letters, so that the typist transcribing the dictated text into typewritten matter can at every moment form a picture of the length of the text still to be transcribed and thereby can make possible the proper distribution of the text on the typewriter sheets. After the dictator by pressing the operating knob 13 has caused the tipping of certain levers 32, e. g., at the end of the letters, to take their upward positions as shown in dotted lines in Figure 1, the fully-dictated tape must be rewound before the transcribing operation can be started. This can be done on the recording machine or upon a reproducing machine. During transcribing, the tape is again driven in the same direction as during recording and the indicator device 11 is driven along shaft 9 synchronously with the progress of the tape until the entire recording has been transcribed.

After transcribing, the tipping levers 32 are moved by finger pressure from their upper position into the lower rest position shown in full lines in Fig. 1. Now the spool container with the indicating arrangement is ready for operation for the recording of new dictation after it has been inserted into the apparatus which serves as the recording apparatus. This embodiment of the invention has the advantage that the indicator means for indicating letter length, by reason of the provision of simple means for restoring the used indicating means, normally does not have to be exchanged for another one, which, however, does not preclude one from mounting the set of indicators 32 on the spool container 2 of the upper cover plate 1 of the magnetic tape apparatus or the like, so that it can be replaced by another one.

In magnetic sound dictation apparatus that has no spool containers, the set of indicator devices 32 can be mounted on the apparatus itself.

I claim:

1. In sound translating apparatus, the combination of a translating head, a container for a sound record carrier removably mounted upon said apparatus, motive means producing relative movement between said head and said carrier, a plurality of indicator members mounted upon said removable container and arranged in a row along a predetermined path, said indicator members remaining attached to said container when said container is detached from the apparatus, each indicator member being individually movable between a rest position and an indicating position, control means mounted for movement along said path and including a manually operable member for moving one of said indicator members from one position to the other, and means moving said control means along said path synchronously with the relative movement between the sound record carrier and the translating head.

2. Apparatus according to claim 1 wherein said indicator members comprise a series of tipping levers having a central dead point between the rest position and the marking position and are tiltable past the dead point by said manually operable member.

3. Apparatus in accordance with claim 2 and including elastic means positioned adjacent said tipping levers and bearing against the ends of said levers to hold them in the position to which they have been set.

References Cited in the file of this patent

UNITED STATES PATENTS

| | | |
|---|---|---|
| 2,506,104 | Prezioso | May 2, 1950 |
| 2,628,841 | Dann et al. | Feb. 17, 1953 |

FOREIGN PATENTS

| | | |
|---|---|---|
| 676,564 | Germany | June 8, 1939 |